Dec. 24, 1963     U. SCHAUFLER     3,115,045
DEVICE FOR STEPLESSLY VARYING THE SPEED OF ROTATION OF
TOOLS AND OTHER ROTATING ELEMENTS
Filed May 24, 1962     4 Sheets-Sheet 1
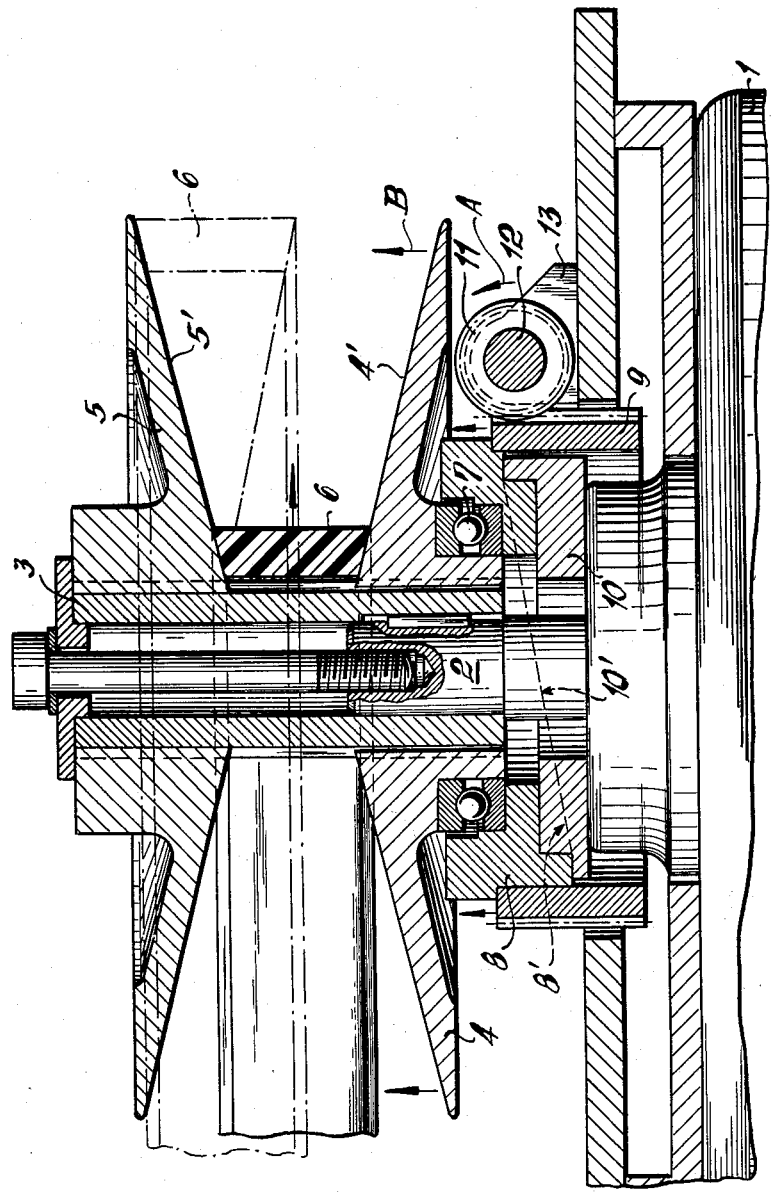
INVENTOR
Ulrich Schaufler
By

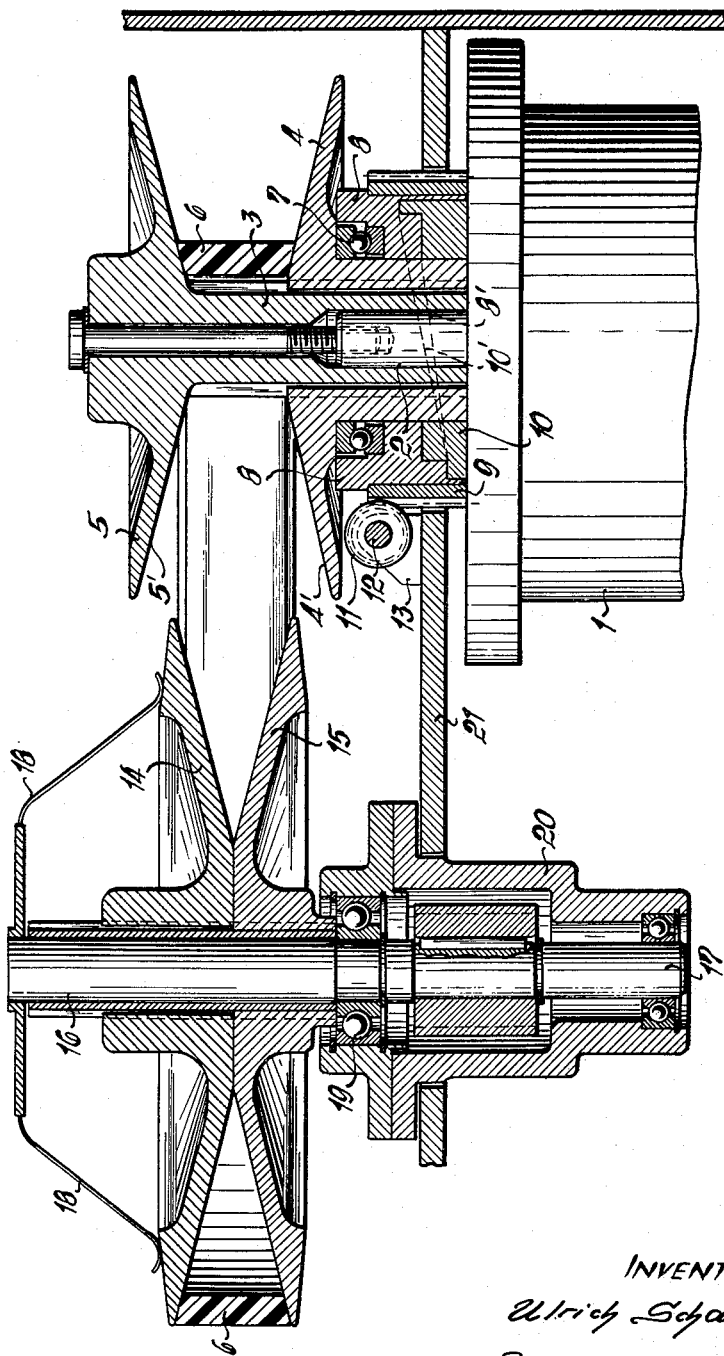

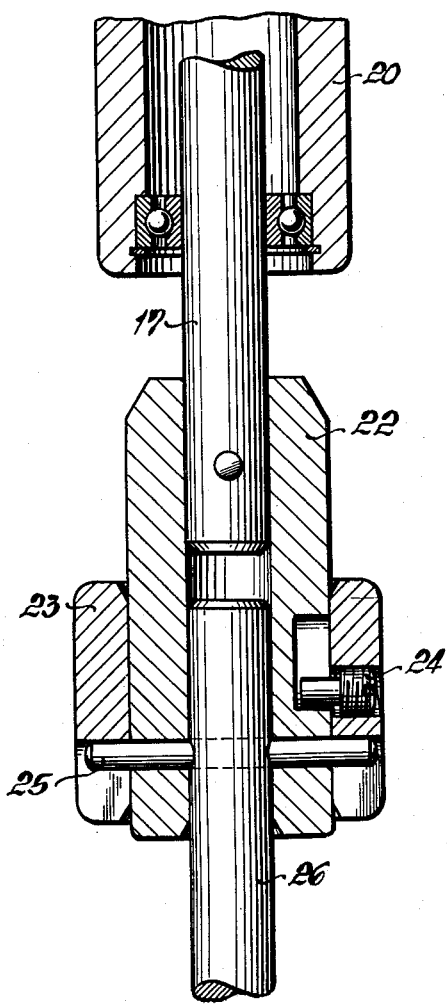

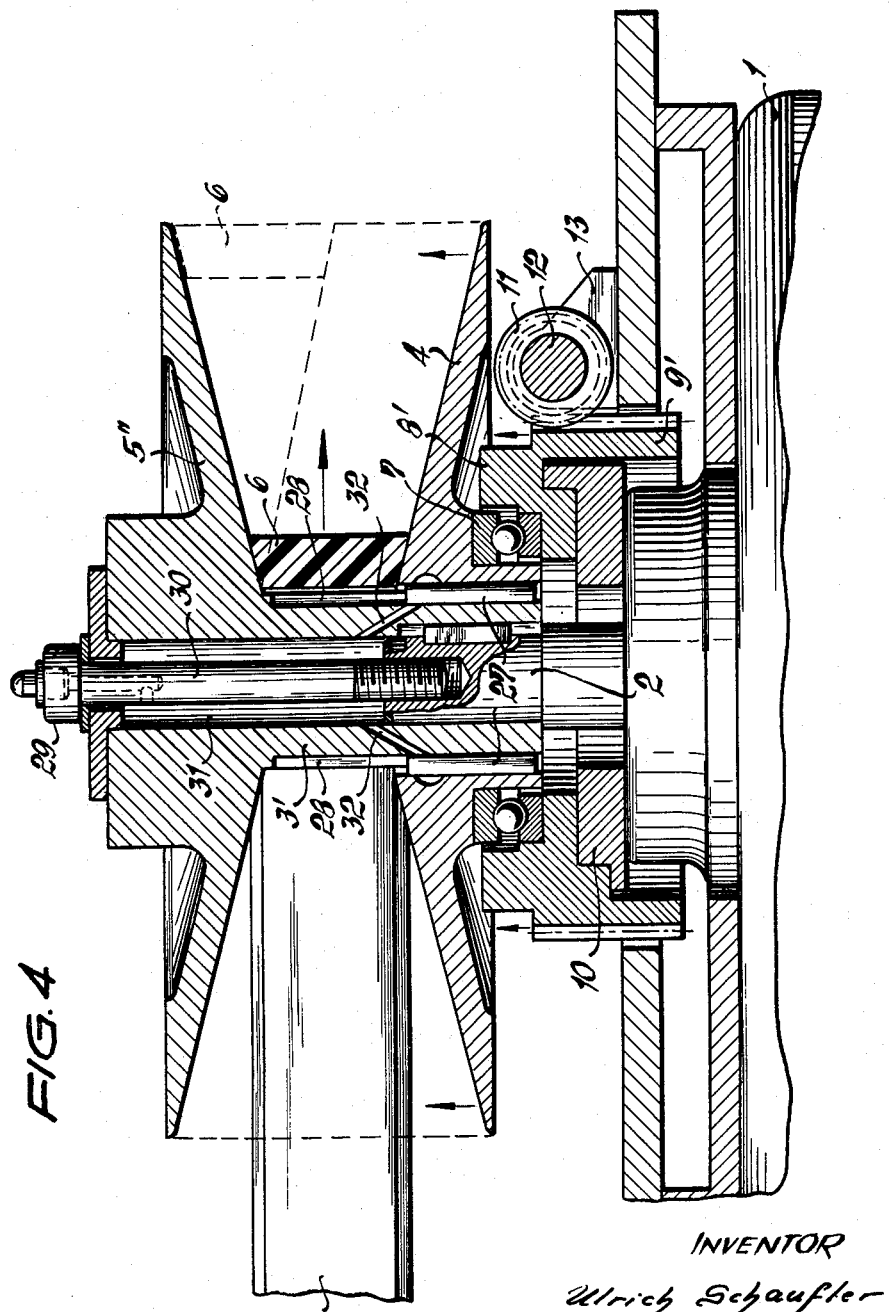

United States Patent Office 3,115,045
Patented Dec. 24, 1963

3,115,045
DEVICE FOR STEPLESSLY VARYING THE SPEED OF ROTATION OF TOOLS AND OTHER ROTATING ELEMENTS
Ulrich Schaufler, Arminstrasse 8, Stuttgart, Germany
Filed May 24, 1962, Ser. No. 197,445
Claims priority, application Germany May 26, 1961
6 Claims. (Cl. 74—230.17)

The present invention relates to a device for varying, in a stepless manner, the rotational speed of tools and other rotating bodies as, for instance, the tools of agitating and beating means, or of the drilling, cutting or other machining tools of various types.

With tools of the above-mentioned type, it frequently becomes necessary to adapt the rotational speed of a tool to the changing machining conditions, for instance, the consistency or hardness of the material to be machined or treated, which frequently can be ascertained only during the working operation and has to be effected during the operation.

It is, therefore, an object of the present invention to provide a device which will make it possible, by simple means, and while requiring a minimum of space and being of relatively light weight, to effect a change in the rotational speed to a desired speed without the necessity of stopping the machine for this purpose.

It is another object of this invention to provide a device of the type set forth in the preceding paragraphs, which can easily be installed in and applied to existing machinery.

These and other objects and advantages of the invention will appear more clearly from the following specification in connection with the accompanying drawings, in which:

FIGURE 1 is an axial section through a device according to the invention for adjusting the rotational speed.

FIGURE 2 shows an example for the application of the device according to the invention for driving a drill or similar tool.

FIGURE 3 is a view of a connecting device for a tool.

FIGURE 4 represents an axial section through a further embodiment of a device according to the invention.

The device according to the invention comprises primarily two dish-shaped discs adjustable relative to each other in axial direction and provided with conical sliding surfaces facing each other for receiving therebetween the driving element of a tool, preferably a V-belt. Such V-belt may be so displaced between said conical surfaces of said discs that the transmission ratio between the driving shaft and the tool mounted on the tool spindle will vary in one or the other direction. Of the said two discs, one disc is fixedly arranged whereas the other disc is axially displaceable through the intervention of a worm wheel drive by means of which said displaceable disc, in response to the rotation of a worm wheel operatively connected thereto, is axially displaced along one or more inclined surfaces. The inclined supporting surface of the worm wheel or a carrier member therefor corresponds to the inclination of the conical surfaces of the two discs, which conical surfaces correspond to the taper of the flanks of the V-belt.

Preferably, the arrangement is such that a pressure disc is fixedly connected to the worm wheel. The axially movable disc with its carrier member rests against said pressure disc through the intervention of a ball bearing. Both discs are connected to a hub by splined teeth. The said hub is driven directly by the motor shaft of a motor, for instance, an electric motor, and the arrangement is such that one of the discs is axially non-displaceably mounted on said hub, whereas the other disc is axially displaceably mounted on said hub.

Referring now to the drawings in detail, FIG. 1 illustrates a device according to the present invention and shows in solid lines the position of the driving element with the smallest diameter of the driving side, whereas in dot-dash lines the outermost position of the driving belt is shown.

The arrangement shown in the drawing comprises an electric driving motor 1 which is stationarily arranged or fixedly connected to the machine frame (not shown in the drawing). The electric motor 1 has a motor shaft 2 to which is keyed a splined hub 3. Mounted on said splined hub 3 are the dish-shaped discs 4 and 5 with conical surfaces 4' and 5' respectively. Received between said conical surfaces 4' and 5' and frictionally engaged therewith, is a V-belt 6.

Disc 5 is rotatably but axially non-displaceably connected to hub 3. The disc 4, however, which is likewise rotatably connected to hub 3, is also axially displaceable thereon and, through the intervention of a ball bearing 7, rests against a pressure plate 8 which latter is pressed into a worm wheel 9 and is movable together with the latter in axial direction thereof. The pressure plate 8 is provided with one or more inclined sliding surfaces 8a resting on one or more corresponding sliding surfaces 10a of a pressure plate 10 which is fixedly connected to the housing of electric motor 1. The arrangement is such that pressure plate 8 will be axially displaced in response to a rotative movement thereof relative to pressure plate 10, thereby bringing about an axial displacement of disc 4 and a radial displacement of the respective belt portion between discs 4 and 5.

The teeth of the worm wheel 9 mesh with the teeth of a worm 11 having its shaft 12 journalled in bearings 13 fixedly connected to the machine frame (not shown). Worm 11 may be rotated during operation in the direction of the arrow A by any convenient means as, for instance, a hand-wheel connected to shaft 12. In response to such a rotation of worm 11, worm wheel 9 will be rotated so that the inclined surface 8a will slide on the inclined surface 10a, with the result that the members 9, 8, 7 and 4 will be moved in the direction of the arrow B toward belt 6, so that the latter is pressed against the disc 5 fixedly connected to hub 3 and moves in radial direction.

Belt 6 has its flanks provided with the same taper as the two discs 4 and 5 so that said belt 6 will, depending on whether worm 11 is moved in the direction of the arrow A or in the opposite direction, be moved toward the outer periphery of discs 4 and 5 or toward the inner periphery thereof, i.e. from the smallest diameter of said disc to the largest diameter thereof, or vice versa. In this way, the transmission ratio with regard to the drive element may be varied in conformity with the respective requirements. The speed adjustment can be effected only as long as the discs rotate.

The arrangement shown in FIG. 2 likewise comprises an electric motor 1 with motor shaft 2 having keyed thereto the hub 3 of a dish-shaped disc 5 with a conical surface 5'. The outer surface of hub 3 is splined and engaged by a dish-shaped disc 4 with a conical surface 4'. Disc 4 is axially displaceable on hub 3 with regard to disc 5. As will be seen from the drawing, in this embodiment, hub 3 is integral with the disc 5. Disc 4 rests, through the intervention of a ball bearing 7, against the pressure plate 8, which latter is provided with inclined sliding surfaces 8' sliding on correspondingly inclined surfaces 10' of pressure plate 10, which latter is fixedly connected to the housing of electric motor 1. Also, this arrangement is provided with a worm 11 with shaft 12. Worm 11 meshes with a worm-wheel 9 to which, similar to the arrangement of FIG. 1, pressure plate 8 is connected so that rotation of worm 11 will, in a manner likewise described in connection with FIG. 1, bring about an axial displacement of pressure plate 8 thereby causing belt 6 to move in radial direction of discs 4 and 5.

As will furthermore be seen from FIG. 2, belt 6 passes over a second pair of dish-shaped discs 14 and 15 rotatably connected to a shaft 16, which latter has its end portion designed for receiving a drill or another rotating tool. The relative axial distance between the said two discs or wheels 14, 15 and thus the transmission ratio between shafts 2 and 16, will be determined by the position of belt 6. The wheel 14 will adjust itself accordingly by the effect of the belt pull and spring 18 continuously urging wheel 14 in axial direction toward wheel 15.

The device illustrated in FIG. 3 for receiving and holding a tool, as for instance a drill, comprises a flange 22 extending over shaft 17. The tool 26 is inserted in that end of flange 22 which faces away from shaft 17. For a simple fastening and exchanging of tool 26, the cylindrical flange 22 has mounted thereon a ring 23. By means of a screw 24 which is radially arranged in ring 23 and the stud of which extends into an axial groove in flange 22, ring 23 is axially movable only within certain limits. In its lower region, ring 23 is radially slotted and the slot extends over the ends of a radially inserted arresting pin 4 which pin extends through flange 22 and work piece 26. By displacing ring 23 in the direction toward shaft 17, its radial slot frees the arresting pin 4 so that the latter is accessible and can be removed from flange 22, and work piece 26 can be removed from the flange.

As will be seen from the drawing, wheel 15, through the intervention of a ball bearing 19, rests against a supporting block 20 which serves for receiving and guiding the tool to be driven.

The entire device comprising the motor, the two pairs of discs or wheels, together with the belt and the bearing block is, by means of a plate 21, combined to a unit which can be employed and installed as an entity.

With the embodiment according to FIG. 4, the dish-shaped disc 5' forms one piece with the hub 3' whereby a simple and inexpensive embodiment may be obtained. Part 5', 3' may be designed as a cast piece. Furthermore, the pressure disc 8' may likewise form a single piece with the worm wheel 9', for instance by designing the same as pressure cast precision member so that it will not require any machining.

The dish-shaped disc 4 according to the embodiment of FIG. 4 is guided in axial direction by guiding members 27 which slide in grooves 28 in the hub. For purposes of lubricating grooves 28, a lubricating medium 29 is provided at the end face of a connecting screw 30. The bore associated therewith leads into a hollow chamber 31 of hub 3'. From here the lubricant passes into grooves 28 through approximately radially arranged passages 32.

It is, of course, to be understood that the present invention is, by no means, limited to the particular constructions shown in the drawings, but also comprises any modifications within the scope of the appended claims.

What I claim is:

1. A device for steplessly varying the rotational speed of tools and other rotating members, which includes: rotatable shaft means, first disc means fixedly connected to said shaft means for rotation therewith, means for holding said first disc means against axial movement on said shaft means, second disc means non-rotatably connected to and axially displaceable on said shaft means, said first and second disc means having those surfaces thereof which face each other tapering from the outer diameter to the inner diameter thereof for receiving therebetween a V-belt of corresponding taper, pressure means substantially coaxially arranged with regard to said second disc means and rotatable relative thereto and engaging the side thereof opposite said first disc means, said pressure means having at least one steeply inclined end surface portion facing away from said second disc means, worm wheel means drivingly connected to said pressure means for rotating the same, stationary means provided with a steeply inclined surface corresponding to and in sliding engagement with said inclined end surface portion, said pressure means being operable in response to a rotation thereof an amount not greater than 180° relative to said stationary means to axially displace said second disc means over the entire range of movement thereof, and rotatable worm means meshing with said worm wheel means for selectively rotating said worm wheel means and said pressure means and for holding the same in rotated positions.

2. A device according to claim 1, in which the inclination of said inclined end surface portion of said pressure means corresponds to the taper of said disc means.

3. A device for steplessly varying the rotational speed of tools and other rotating members, which includes: rotatable shaft means, first disc means fixedly connected to said shaft means for rotation therewith, means for holding said first disc means against axial movement on said shaft means, second disc means non-rotatably connected to and axially displaceable on said shaft means, said first and second disc means having those surfaces thereof which face each other tapering from the outer diameter to the inner diameter thereof for receiving therebetween a V-belt of corresponding taper, pressure plate means arranged coaxially with but in spaced relationship to said second disc means, anti-friction thrust bearing means interposed between and engaging said pressure plate means and said second disc means, worm wheel means operatively connected to said pressure plate means for rotating the latter, said pressure plate means having at least one steeply inclined end surface portion facing away from said second disc means, stationary means provided with a steeply inclined surface corresponding to and in sliding engagement with said inclined end surface portion, and rotatable worm means meshing with said worm wheel means for selectively rotating said worm wheel means and thereby said pressure plate means and for holding the same in adjusted position to effect an axial displacement of said second disc means relative to said first disc means.

4. A device for steplessly varying the rotational speed of tools and other rotating members, which includes: motor means having an output shaft, splined hub means keyed to said output shaft for rotation therewith, first disc means fixedly connected to said splined hub means for rotation therewith, said first disc means being stationary with regard to said hub means, second disc means non-rotatably connected to and axially displaceable on said hub means, said first and second disc means having those surfaces thereof which face each other tapering from the outer diameter to the inner diameter thereof for receiving therebetween a V-belt of corresponding taper, pressure means substantially coaxial with said second disc means and engaging the side thereof opposite said first disc means and rotatable relative thereto, said pressure means having at least one steeply inclined end surface portion facing away from said second disc means, stationary means provided with an inclined surface corresponding to and in sliding engagement with said inclined end surface portion, worm wheel driving means drivingly connected to said pressure means for selectively rotating same, and a worm meshing with said worm wheel.

5. In combination: rotatable shaft means, first disc means fixedly connected to said shaft means for rotation therewith, means for holding said first disc means against axial movement on said shaft means, second disc means non-rotatably connected to and axially displaceable on said shaft means, said first and second disc means having those surfaces thereof which face each other tapering from the outer diameter to the inner diameter thereof for receiving therebetween a V-belt of corresponding taper, pressure means substantially coaxial with said second disc means and having at least one steeply inclined end surface portion facing away from said second disc means, said pressure means engaging said second disc means on the side thereof opposite said first disc means, stationary means provided with an inclined surface corresponding to and in sliding engagement with said inclined end surface portion, worm wheel driving means drivingly connected to said pressure means for selectively rotating said pressure means, a driving worm meshing with said worm wheel, driven shaft means laterally spaced from said rotatable shaft means, third and fourth disc means mounted on and non-rotatably connected to said driven shaft means for rotation therewith, said third and fourth disc means having surfaces thereof tapering from the outside diameter toward the inside diameter thereof in correspondence with the taper of said first and second disc means, V-belt means having its flanks tapering in conformity with the taper of said first and second disc means and said third and fourth disc means and arranged between said first and second disc means on one hand and said third and fourth disc means on the other hand, said third and fourth disc means being movable relative to each other in axial direction of said driven shaft means, and stationary supporting means supporting both said rotatable shaft means and said driven shaft means.

6. An arrangement according to claim 5, which includes spring means connected to said driven shaft means and engaging at least one of said third and fourth disc means and continuously urging said third and fourth disc means to move relatively toward each other.

References Cited in the file of this patent

UNITED STATES PATENTS

| | | |
|---|---|---|
| 2,541,766 | Jereb | Feb. 13, 1951 |
| 2,566,997 | Schweickart | Sept. 4, 1951 |
| 2,893,254 | Grover | July 7, 1959 |
| 2,976,739 | Lewellen et al. | Mar. 28, 1961 |

FOREIGN PATENTS

| | | |
|---|---|---|
| 806,401 | Great Britain | Dec. 23, 1958 |